(12) United States Patent
Nygard

(10) Patent No.: US 7,854,978 B1
(45) Date of Patent: Dec. 21, 2010

(54) TAPE STRIP WITH TAB

(76) Inventor: Eric Nygard, 13 Yorkshire Dr., Lincolnshire, IL (US) 60069

( * ) Notice: Subject to any disclaimer, the term of this patent is extended or adjusted under 35 U.S.C. 154(b) by 317 days.

(21) Appl. No.: 11/781,168

(22) Filed: Jul. 20, 2007

Related U.S. Application Data

(60) Provisional application No. 60/832,521, filed on Jul. 21, 2006.

(51) Int. Cl.
*B32B 9/00* (2006.01)
*B32B 7/12* (2006.01)
*B65D 65/28* (2006.01)

(52) U.S. Cl. .................. 428/40.1; 428/42.2; 428/42.3; 428/43; 428/343; 428/906

(58) Field of Classification Search ............... 428/40.1, 428/42.1, 42.2, 42.3, 41.9, 43, 343, 906; 283/62
See application file for complete search history.

(56) References Cited

U.S. PATENT DOCUMENTS

| | | | | |
|---|---|---|---|---|
| 4,968,540 | A * | 11/1990 | Linsenbigler | 428/5 |
| 5,516,581 | A * | 5/1996 | Kreckel et al. | 428/317.3 |
| 5,658,632 | A * | 8/1997 | Krabill | 428/43 |
| 6,168,829 | B1 * | 1/2001 | Russ et al. | 427/208.4 |
| 6,541,089 | B1 * | 4/2003 | Hamerski et al. | 428/40.1 |
| 2008/0216946 | A1 * | 9/2008 | White | 156/230 |

OTHER PUBLICATIONS

3M Command Adhesive Tab.

* cited by examiner

*Primary Examiner* — Patricia L Nordmeyer
(74) *Attorney, Agent, or Firm* — Drinker Biddle & Reath LLP

(57) ABSTRACT

A tape strip has a tab section and an adhesive section. The adhesive section may have an adhesive on one or both planar surfaces of the strip. When the adhesive portion has adhesive on both planar surfaces, the tape strip may or may not comprise a separation mechanism that permits a separation of the tab portion from the adhesive portion. When the adhesive portion has adhesive on only one planar surface, the tape strip comprises the separation mechanism.

15 Claims, 1 Drawing Sheet

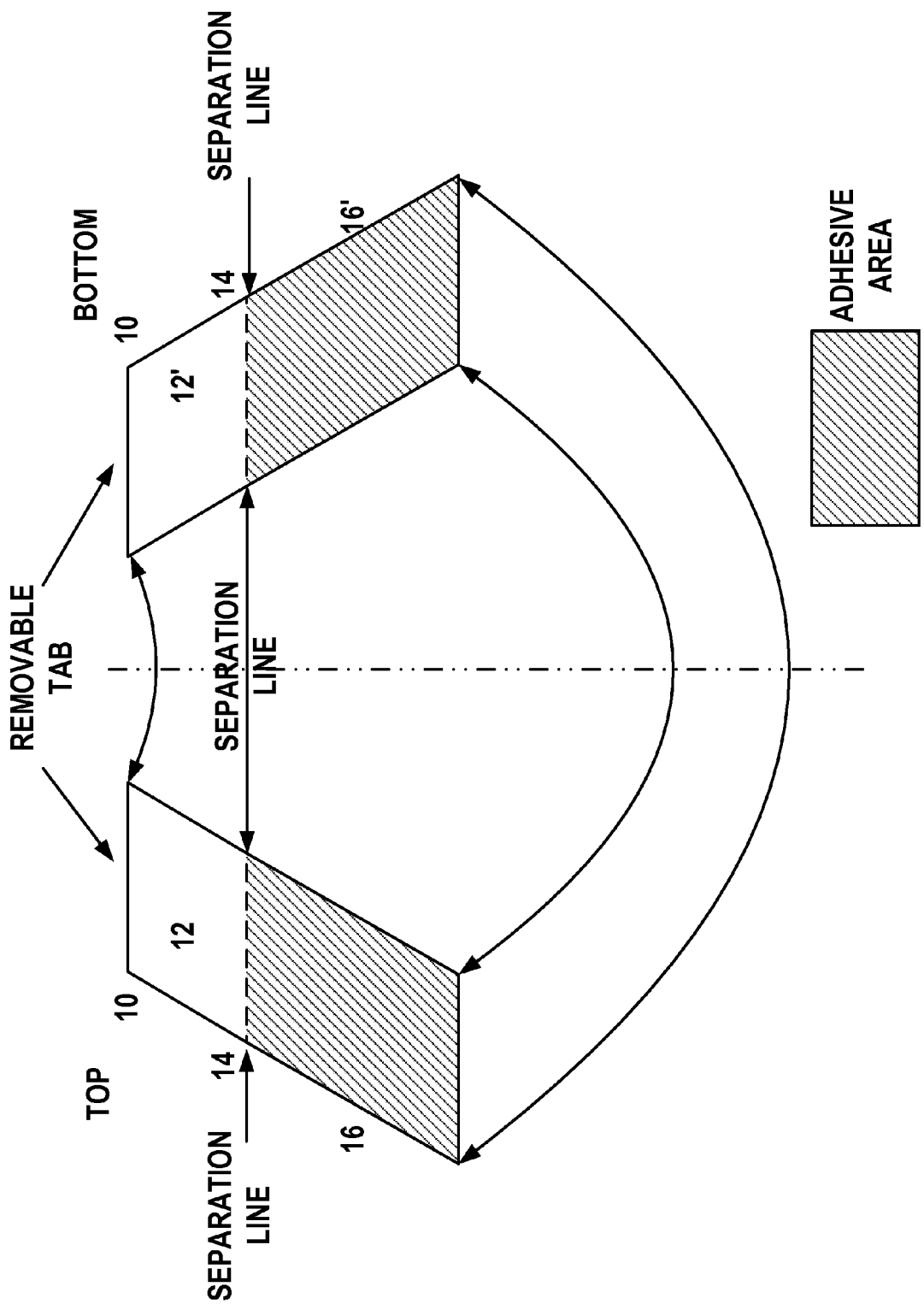

TAPE STRIP WITH TAB

CROSS REFERENCE TO RELATED APPLICATIONS

The present application claims the benefit of U.S. Provisional Application No. 60/532,521, filed Jul. 21, 2006, herein incorporated by reference.

BACKGROUND

The present invention relates to a tape strip having a tab section and an adhesive section. The adhesive section may have an adhesive on one or both planar surfaces of the strip. When the adhesive portion has adhesive on both planar surfaces, the tape strip may or may not comprise a separation mechanism that permits a separation of the tab portion from the adhesive portion. When the adhesive portion has adhesive on only one planar surface, the tape strip comprises the separation mechanism.

Double-sided tape is well known in the art. Such tape can be used to join two planar or conforming surfaces comprised of various materials. These materials can be paper, cardboard, plastic, glass, sheet metal, foil, wood, etc.

One of the problems with double-sided tape is that it can be difficult to handle. Such tape may come in a roll, wherein, e.g., a serrated cutting edge is used to separate a strip of double-sided tape from the roll. It is also know in the art to provide precut double-sided strips to a user. A disadvantage of these approaches is that the user must grasp a portion of this tape, thereby causing the tape to stick to the fingers of the user, making it difficult to precisely place and release, and furthermore possibly contaminating and compromising, to some extent, the adhesive on the tape.

One solution has been to provide cover sheets to one or both sides of the tape prior to placement. This has the advantage that at least one adhesive surface is protected from contact with the user prior to placement. However, such tape is still difficult to handle and place properly because generally at least one adhesive surface must still be contacted. Furthermore, such tape requires an additional step of removing one or more cover sheets in order to fully contact the desired surfaces. It can often be difficult to separate the cover sheet from the tape.

It is also known to provide adhesive tape strips cut to a predetermined length comprising an adhesive section that is coated on one side with adhesive, and a tab section that contains no adhesive. Such tape strips are frequently used for marking sections of a document, where the non-adhesive section may be colored and/or labeled.

SUMMARY

Inventively, a tape strip having a non-adhesive tab section and an adhesive section of a predefined length is provided. In an embodiment in which the adhesive section is double-sided, i.e., comprises adhesive on both sides, then, in a first variant, the tape strip contains no separation mechanism for separating the tab from the strip after it is applied, and, in a second variant, contains a separation mechanism for separating the tab from the strip after it is applied, permitting the tab portion to be relatively easily removed from the adhesive portion in a non-destructive manner.

In a further embodiment, the tape strip comprises adhesive on only one side, but contains a separation mechanism for separating the tab from the strip after it is applied.

According to the first double-sided variant, two surfaces to be joined are contacted with opposite planar sides of adhesive portion of the tape strip. In this application, the tab remains in place after the surfaces are contacted. Such a strip could be used where it is desirable to contact two objects in a non-destructive manner. One exemplary use could be in a painting application, where one side of a removable double-sided tape adheres to a surface to be painted, and the other side is used to hold a larger masking surface, such as plastic or newspaper. Advantageously, one does not have to use a razor blade or other mechanism to remove the tape—rather, the tab can be easily grasped and pulled on to remove the tape.

For example, in known solutions, two pieces of paper, such as a check and its associated bill, are stapled together. Unfortunately, this creates permanent holes in both documents. Alternately, these documents can be affixed with a paper clip. However, the paper clip does not provide a good attachment, often permitting the papers to move relative to one another or become separated, and the paper clip can create impression marks in the documents that can be difficult to move.

The present two-sided tape strip implementation permits a firm affixing of the documents without damaging them. In a preferred embodiment, a removable-tape-class adhesive is used so that the documents can be separated without damage at some other time. However, any appropriate strength adhesive may be used, ranging from one that simply has a tackiness and permits easy separation so as not to damage the surfaces that the strip adheres to, to a strength in which the adhesive bond exceeds the strength of the surface material to which the tab adheres. In this embodiment, it may be possible to write a note on the tab portion that affixes the two documents together.

In the second embodiment, after applying the double-sided tape strip and adhering two surfaces together, in a situation where having the tab remain is undesirable, it is possible to provide a separation mechanism so that the tab portion may be removed from the strip after placement. This separation mechanism could take on a variety of forms, such as perforations, scoring, pre-slits at some portion, preferably on one or both sides, but also possibly in the middle. The separation mechanism would include any mechanism that provides a material weakening permitting easy separation of the tab section from the adhesive section after placement.

Another use for this embodiment could be to wrap packages, such as gifts. The wrapping paper is stuck together using the two-sided tape (which can be accurately positioned due to the tabs), and then the tab portions are removed.

DESCRIPTION OF THE DRAWINGS

The invention is explained in detail below with reference to the drawing FIGURE, which is a pictorial illustration of both sides of a double-sided tape strip according to an embodiment of the invention.

DETAILED DESCRIPTION OF THE PREFERRED EMBODIMENTS

The FIGURE illustrates an embodiment for a double-sided tape strip having a removable tab according to a preferred embodiment (top and bottom views). In the FIGURE, a double sided tape strip 10 comprises a tab section 12, 12' having no adhesive, and an adhesive section 16, 16' having an adhesive material on both sides. The separation mechanism 14 is provided along a separation line that delineates the tab section 12 from the adhesive section 16 and permits relatively easy and non-destructive separation of the tab section 12 and the adhesive section 16. Once the tape strip 10 is properly placed, either by contacting one or both surfaces to be joined, the tab section 12 is removed.

It should be noted that the tape strip 10 can be any size, and that the tab section 12 and adhesive section 16 can further comprise any proportionate size within the strip 10. Furthermore, the tape can be any color or combination of colors and can be made of any suitable material, which can be plastic, metal/metal foil, foam, etc. The thickness of the tape can be varied as well. Any know adhesive may be used, ranging from weak adhesives that have removable properties to very strong adhesives that provide a strong bond. Furthermore, the adhesive material used on one side can be stronger than that used on the other side where such a variation is desirable (e.g., one side could be a removable type adhesive, whereas the other could be more permanent). Various adhesives could be used that are optimized for the materials to be joined. For example, when used in a photo album or a scrapbook, and adhesive suited for the album/book page (such as one with acid-free properties) could be used on one side, whereas an adhesive suited for a photograph could be used on the other. Various uses for such tape strips 10 could include scrapbooking, photo album assembly, gift wrapping, etc. The tab section 12 may comprise a writable surface and/or printable surface.

The surfaces so affixed do not necessarily have to be flat. They can be conforming surfaces (such as would be formed by two spoons stacking together), provided the curved or angled surfaces are close enough to permit sufficient contact with the strip to adhere. Where the tape strip is thick, (e.g., $1/16"$ to $1/4"$) the degree of required conformance between the surfaces is minimized.

An embodiment of the tape strip 10 comprises the tab section 12 and the adhesive section 16 with the separation mechanism 14 separating the sections 12, 16, but the adhesive section 16 only comprises adhesive on one side. This could be used, e.g., as a form of a price tag wherein the tab section 12 has a price of a good written on it that can be easily removed without peeling after purchase.

The packaging of these tape strips 10 could be in a form of stacked individual strips that could be included in a package, possibly with an isolating cover sheet or strip between the strips 10 to which the adhesive section 16 does not appear. The cover sheets could also protect the adhesive section 16 from adhering to undesired entities.

Alternately, the tape strips 10 could be packaged in a roll, with an isolating layer in between, similar to that used by double-sided tape. In the embodiment in which there is no separation mechanism 14 between the tab section 12 and the adhesive section 16, a separate separation mechanism between the tape strips 10 as a whole could be used for easy removal of a single tape strip 10 from the roll. Alternately, in the roll-based embodiment, the separation mechanism between the tape strips 10 as a whole could be weaker than the separation mechanism 14 between the tab section 12 and the adhesive section 16 such that an individual tape strip 10 could be removed from the roll without causing a separation of the tab section 12 and the adhesive section 16.

Alternately, the tape strips 10 could be arranged on a sheet that could be provided, e.g., to a printer. In the two-sided adhesive variant, protective covers would be provided on the top-layer adhesive until ready to use.

It should be noted that the tape strip 10 shown in the FIGURE is illustrated as being rectangular. However, the tape strip 10 is not limited to a rectangular shape, but rather can comprise rounded, or other curved shapes, and can comprise any linear geometric forms, such as triangles, polygons, etc. And each section 12, 16 can be any shape independent of the other section 16, 12. For example, the tab section 12 could comprise a rounded shape that is easily graspable by a user's fingers.

Also, the separation mechanism 14 is shown as being linear, but the invention is not limited in this manner, and the separation mechanism can take on any possible curved and/or linear segmented shape.

On further possible variant is an embodiment where the tab section 12 comprises an adhesive on only one side, wherein the adhesive section 16 comprises an adhesive on both sides. This variant could also be provided in as either having a separation mechanism or not.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

What is claimed is:

1. A tape strip comprising:
   an adhesive section that comprises an adhesive material on opposite planar sides of the tape strip;
   a tab section that comprises no adhesive material on either side of the tape strip that can be gripped by a user; and
   a separation mechanism that permits relatively easy and non-destructive separation of the tab section from the adhesive section, thereby leaving only the adhesive section.

2. The tape strip according to claim 1, further comprising: a covering strip that covers at least the adhesive section and prevents the tape strip from adhering to another surface.

3. The tape strip according to claim 1, wherein the tape strip is made of a material selected from the group consisting of plastic, metal, a metal foil, and foam.

4. The tape strip according to claim 1, wherein the adhesive is a removable adhesive that can be removed from an applied surface without damaging the surface.

5. The tape strip according to claim 1, wherein at least the adhesive section is between $1/16"$ and $1/4"$ thick.

6. The tape strip according to claim 1, wherein the tab section comprises a writeable, or printable surface.

7. The tape strip according to claim 1, wherein the tape strip has an overall rectangular shape.

8. The tape strip according to claim 1, wherein the tape strip has at least one curved edge.

9. A roll of tape strips comprising a plurality of tape strips according to claim 1, wherein each tape strip has a tape strip separation mechanism separating them.

10. The tape strip according to claim 1, wherein the separation mechanism is selected from the group consisting of: perforations, scoring, notches, and one or more slits.

11. The tape strip according to claim 1, wherein the separation mechanism is located on one transverse edge, on both transverse edges, or in a middle transverse region between both transverse edges.

12. The tape strip according to claim 1, wherein the separation mechanism comprises curved portions.

13. A roll of tape strips comprising a plurality of tape strips according to claim 1, wherein each tape strip has a tape strip separation mechanism separating them.

14. The roll of tape strips according to claim 13, wherein the tape strip separation mechanism requires less force to separate than the separation mechanism between the tab section and the adhesive section.

15. The tape strip according to claim 1, wherein a plurality of tape strips are arranged on a roll on a sheet, or in a stack.

* * * * *